United States Patent [19]

Stott

[11] 3,886,959
[45] June 3, 1975

[54] GLASS WASHING MACHINE

[76] Inventor: Reginald W. Stott, 4021 Farrington St., Burnaby, British Columbia, Canada

[22] Filed: May 14, 1973

[21] Appl. No.: 360,009

[30] Foreign Application Priority Data
May 18, 1972 Canada.............................. 142481

[52] U.S. Cl................ 134/134; 134/148; 134/151; 134/156; 134/165; 134/199
[51] Int. Cl............................................. B08b 3/02
[58] Field of Search............ 134/83, 126, 131, 133, 134/134, 148, 151, 156, 165, 199

[56] References Cited
UNITED STATES PATENTS

| | | | |
|---|---|---|---|
| 2,622,608 | 12/1952 | Moore et al. | 134/165 X |
| 2,899,967 | 8/1959 | Firestone | 134/148 X |
| 3,070,104 | 12/1962 | Faust et al. | 134/165 X |

FOREIGN PATENTS OR APPLICATIONS

| | | | |
|---|---|---|---|
| 328,140 | 4/1930 | United Kingdom | 134/165 |

Primary Examiner—Robert L. Bleutge
Attorney, Agent, or Firm—Spencer & Kaye

[57] ABSTRACT

An improved glass washing machine, including an improved conveyor table is provided. The table includes a loading station provided with an infeed driven roller conveyor, a take-off station provided with an outfeed driven roller conveyor, and an intermediate washing station including a driven roller conveyor. The table preferably includes a pair of parallel longitudinal rail members. A driven worm gear, preferably formed of a synthetic plastics material, e. g. nylon, is disposed and rotatably mounted adjacent and parallel to one such rail member. A plurality of driven rollers is disposed between the rails, e.g. transverse rollers, each driven roller including a pinion, preferably formed of a synthetic plastics material, e.g. nylon or Delrin. The pinions operatively engage and are driven by the worm gear. To provide the table as a table for a glass washing machine, the table is provided with a plurality of hollow tubes, disposed between selected roller conveyors and disposed along the length of the conveyor. Each of the tubes is formed with a plurality of upwardly directed spray nozzles, the upper level of each such hollow tube being coincident with the upper level of the conveyor rollers.

12 Claims, 11 Drawing Figures

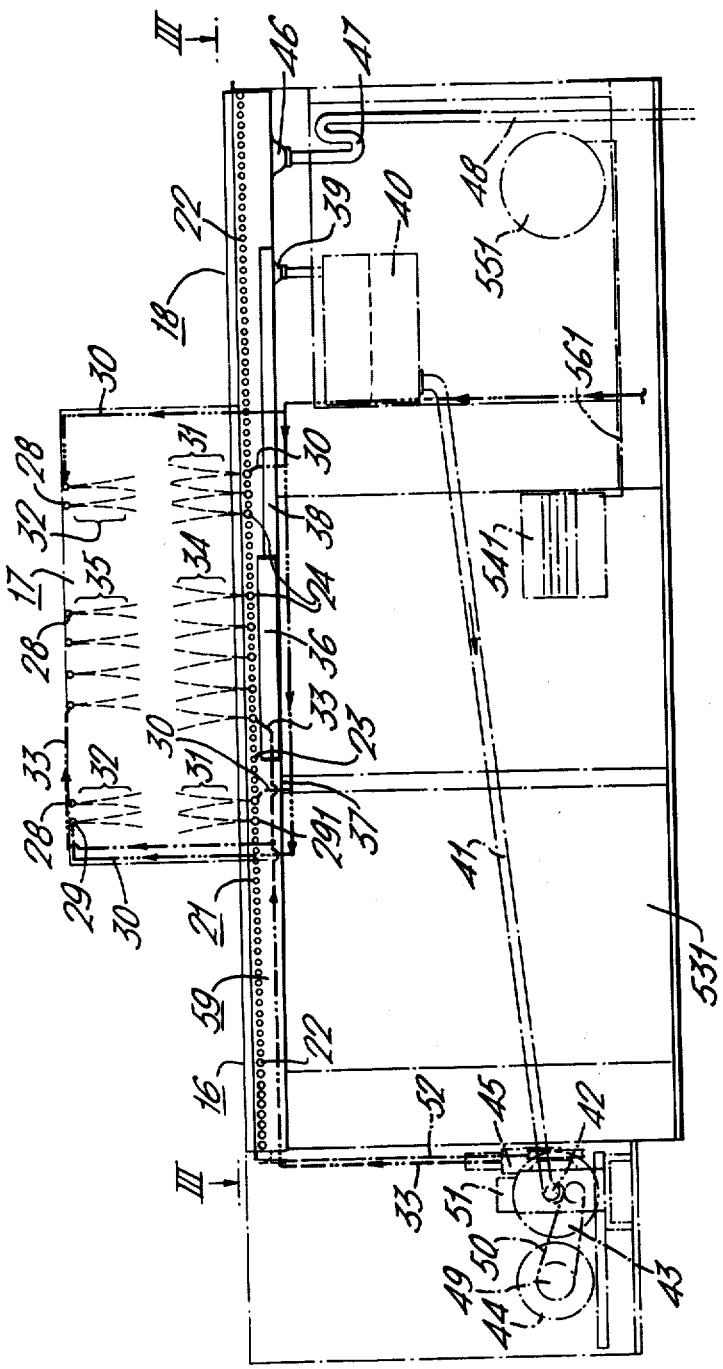

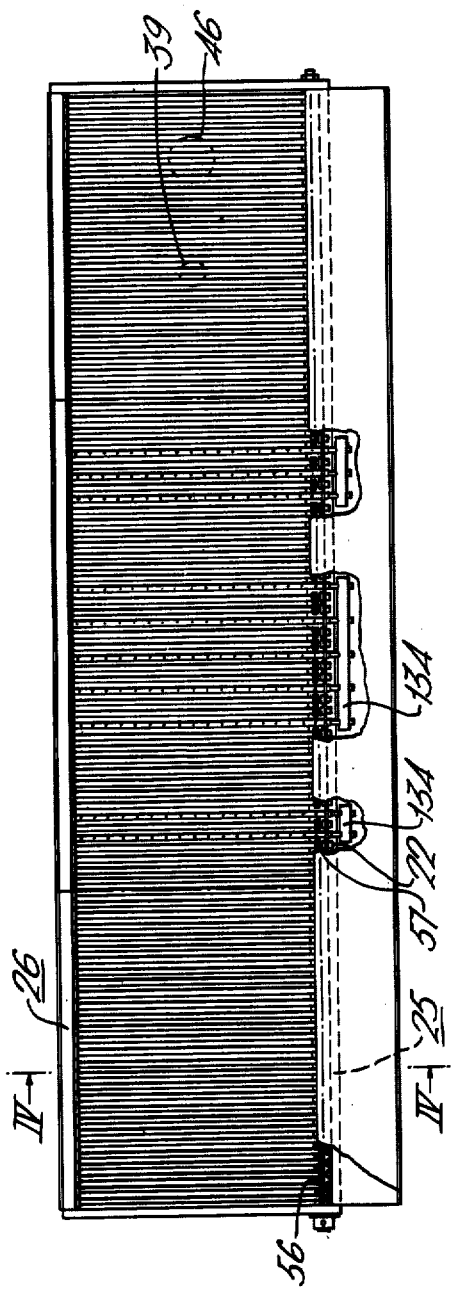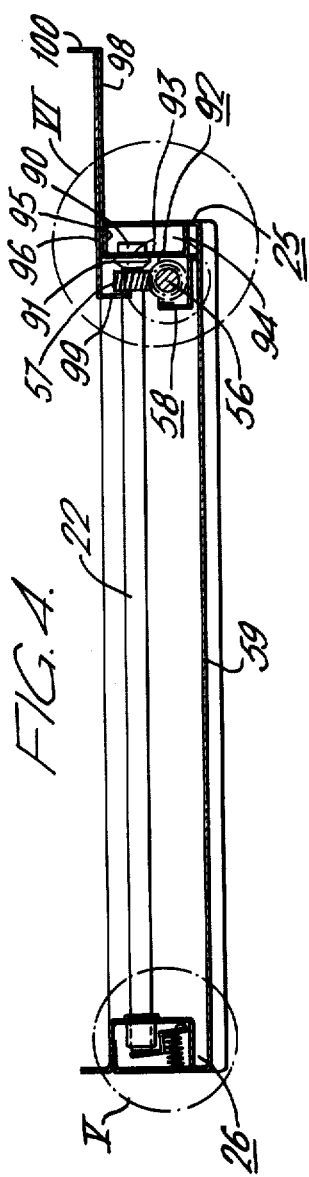

GLASS WASHING MACHINE

BACKGROUND OF THE INVENTION

1. Field of the Invention

This invention relates to glass washing apparatus, and more particularly to apparatus for washing and sterilizing beer glasses. It also relates to a novel conveyor table for such glass washing machines.

2. Description of the Prior Art

Basically all glass washing machines must be provided with conveying means for moving the glasses into a washing area, with means in the washing area for washing and preferably also sterilizing, by means of impinging water and sterilizing chemical sprays, both the inside and the outside of the glasses, and conveyor means for moving the glasses out of the washing area. There are problems involved in the prior art machines both in respect of the conveyor means, and in respect of the washing and sterilizing sprays.

Conventioanl glass washing machines normally include means whereby the glasses are passed progressively through the washing elements, the glasses then being deposited at the other end of the machine ready for use. The conveyor means heretofore used for moving such glasses either incorporates chains or links or belts of some type. The abrasive action on the lip of the glass, caused by the grating action of a conveyor belt prematurely shortens the life of the glasses. In addition, as it is usual to pass the glasses through the machine in the inverted position, it is quite common for the belt or conveyor to catch the lips of the glasses with subsequent cracking or breaking to the glasses occurring.

This is particularly prevalent when the machine is loaded to capacity so that glasses can no longer pass through the machine, thus causing the conveyor to slip. Under these conditions it is quite common for a projecting portion of the conveyor to catch the edge of the glass and crack it.

Another system is the so-called "walking beam" principle, disclosed in Canadian Pat. No. 522,272 issued Mar. 6, 1956 to W. H. Barrie. In such system, movement forward is by an intermittent sequence, involving a repetition of the steps wherein a grid belt raises up slightly, e.g. about ¼ inch, moves forward slightly, e.g. about ¾ inches, drops down level to the surface, and returns to the original position.

The "walking beam" conveyor suffers the deficiency in its propelling action that it causes undue stress on the back row of the glasses when the machine is fully loaded, thus tending to cause glass breakage.

In yet another system, a conveyor consists of a plurality of power driven rollers. In one such system, shown in Canadian Pat. No. 597,677 issued May 10, 1966 to Pittsburgh Plate Glass Co., the rollers each have gears at one end, entrained by an endless interconnecting chain. In another such system, shown in Canadian Pat. No. 227,889, the conveyor rollers each have a gear at one end. One gear meshes with a gear in a line shaft. Alternate gears are fixed to the conveyor roller, with the other gears being loose. The entire series of gears mesh with each other from end to end of the conveyor.

Each of the power driven roller conveyor systems suffers the deficiency that the noise level during operation is excessively high. Moreover, the rate of movement of the conveyor is not steady.

In addition to the above-noted deficiencies of the conveyor systems as outlined above, there are deficiencies in the manner of washing and sterilizing the glasses. All the systems above-noted have spray heads located below the surface of the conveyor, which are adapted to spray upwardly into the interior of the glasses. In addition, the system in Canadian Pat. No. 597,677 provides upward sprays from below the level of the conveyor at an angle of about 45° towards the downstream roller conveyor.

The disadvantages of this location of the spray heads are twofold: (1) the distance of the glass from the origin of the spray tends to cause weak cleansing action; and (2) the deflection of the cleanser spray, caused by the cleanser hitting the conveyor belt or the roller conveyors, can cause impaired cleaning action.

Furthermore, in the powered roller, the "conveyor belt" and the "walking beam" systems, cleansing and servicing of the conveyor means are time consuming and costly procedures because the machine usually requires major dismantling. In order to clean the conveyor belt, the master links must be undone and the entire conveyor track removed.

AIMS OF THE INVENTION

An object of one aspect of this invention is the provision of a conveyor system for a glass washing machine in which the glasses are gently urged through the glass washing zone.

An object of another aspect of this invention is to provide an improved glass washing machine in which the spray nozzles are situated for optimum impact of cleaning solution on the glasses.

An object of a further aspect of this invention is the provision of a conveyor system in which cleaning and servicing problems are minimized.

SUMMARY OF THE INVENTION

1. BROAD STATEMENT OF THE INVENTION

By one broad aspect of this invention, an improved conveyor table for a glass washing machine is provided, including a pair of parallel longitudinal rail members; a driven worm gear, preferably formed of a synthetic plastics material, e.g. nylon, disposed adjacent and parallel to one such rail member, and a plurality of driven rollers disposed between the rails, e.g. transverse rollers, each driving roller including a pinion, preferably formed of a synthetic plastics material, e.g. nylon or Delrin, operatively engaging and driven by the worm gear.

2. VARIANTS OF ONE ASPECT OF THE INVENTION

This type of worm-pinion drive is silent and provides gentle uniform conveying action. Such gentle action of the rollers when conveying the glasses through the glass washing machine minimizes stress and wear on the glasses, thus giving them longer life. The rollers are preferably made of stainless steel tubing (having the advantage of substantially no corroding action) with those on the loading and take-off areas being covered with synthetic plastics material tubing, e.g. polyethylene, in order to protect the glasses.

In another embodiment of this invention, each of the driven rollers of the conveyor is mounted within an associated bushing and is held in place against resiliently active pressure, e.g. by means of a pivotally mounted bench plate urged by a coil spring. Thus, the conveyor rollers are spring loaded and readily dismantled, thus

3 allowing the entire conveyor system to be cleaned within minutes.

3. VARIANTS OF SECOND ASPECT OF THE INVENTION

By another aspect of this invention, another improved glass washing machine is provided, having an improved conveyor table, the table being provided with a loading station provided with infeed driven roller conveyor means, a take-off station provided with outfeed driven roller conveyor means, and an intermediate washing station including driven roller conveyor means, and the glass washing machine being provided with a plurality of hollow tubes, disposed between selected roller conveyors and disposed along the length of the conveyor, each tube being provided with a plurality of upwardly directed spray nozzles, the upper level of each such hollow tube being coincident with the upper level of the conveyor rollers.

Such spray tubes are located on the same level as the rollers thus allowing for optimum impact of cleanser on the glass and minimizing deflection of the cleanser.

4. VARIANTS OF A THIRD ASPECT OF THIS INVENTION

By yet another aspect of this invention, yet another improved glass washing machine is provided, having an improved conveyor table, the table being provided with a loading station provided with infeed driven roller conveyor means, a take-off station provided with outfeed driven roller conveyor means, and an intermediate washing station including driven roller conveyor means, said conveyor table including a pair of parallel longitudinal rail members; a driven worm gear, preferably formed of a synthetic plastics material, e.g. nylon, disposed adjacent and parallel to one such rail member, and a plurality of driven rollers disposed between the rails, e.g. transverse rollers, each driving roller including a pinion, preferably formed of a synthetic plastics material, e.g. nylon or Delrin, operatively engaging and driven by the worm gear, and the glass washing machine being provided with a plurality of hollow tubes, disposed between selected roller conveyors and disposed along the length of the conveyor, each tube being provided with a plurality of upwardly directed spray nozzles, the upper level of each such hollow tube being coincident with the upper level of the conveyor rollers.

Another distinct advantage of the system of aspects of this invention is that the conveyor drive system is constructed in such a manner that allows for a shallow pan thus leaving extra storage and refrigeration space below in the cabinet in which the glass washing zone and conveyor is mounted. This could allow for the mounting of the "BeerMaster" draft beer dispenser system in the cabinet. The "BeerMaster" is disclosed and claimed in the following United States Patent, presently assigned to BeerMaster Industries Ltd., namely U.S. Pat. No. 3,257,033 issued June 21, 1966.

DESCRIPTION OF THE DRAWINGS

1. BRIEF DESCRIPTION OF THE DRAWINGS

Figure 1:
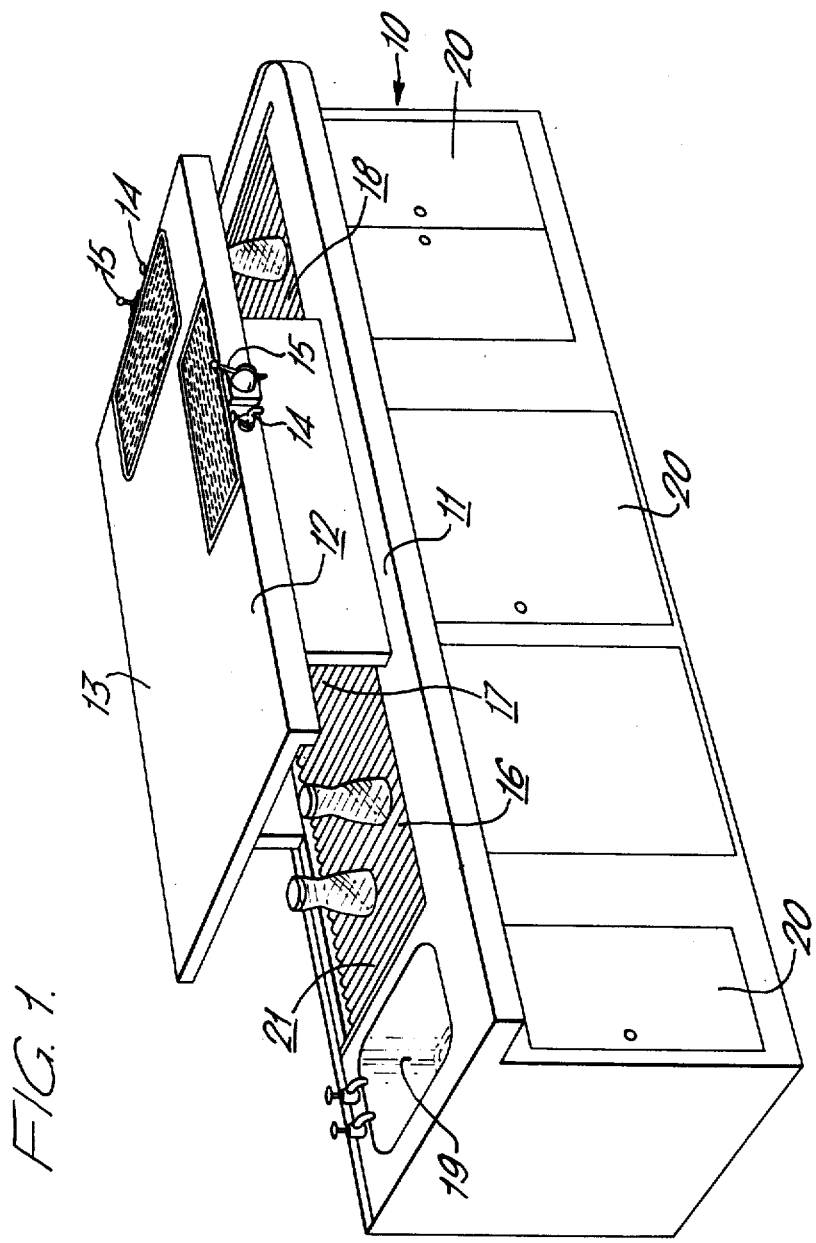
Figure 5:
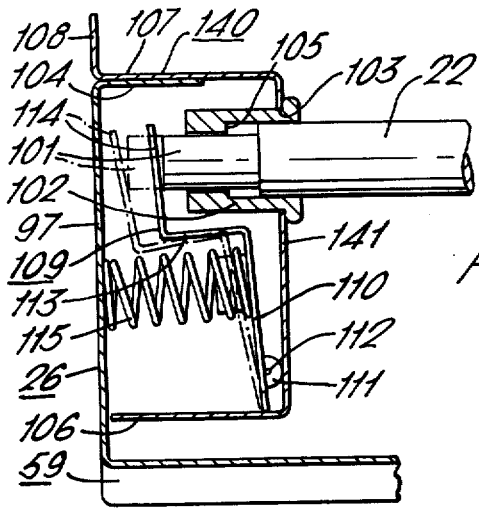
Figure 6:
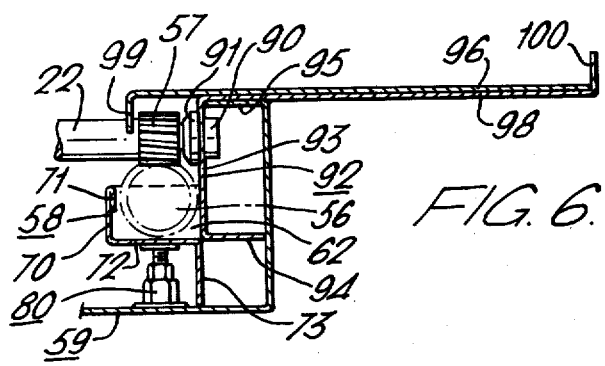
Figure 7:
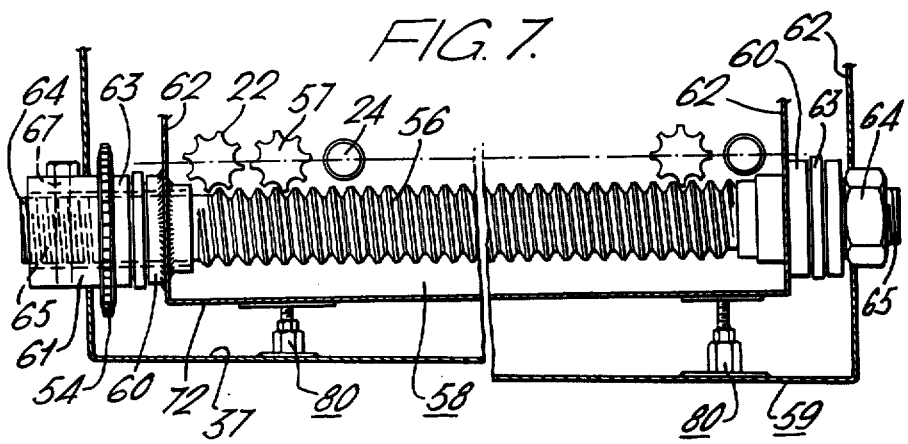
Figure 8:
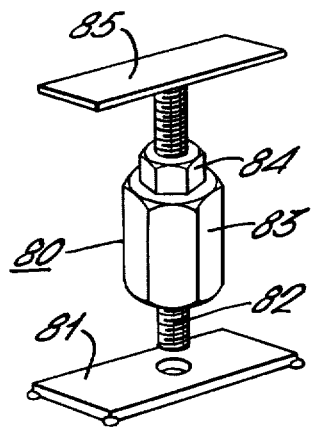
Figure 9:
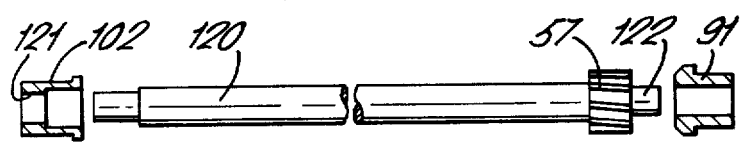
Figure 10:
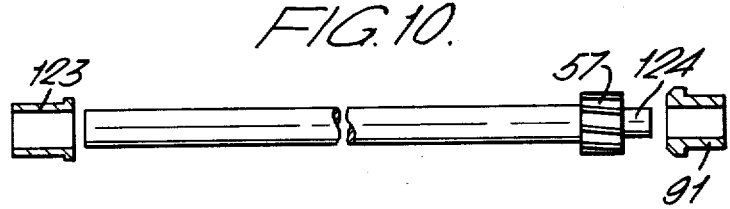
Figure 11:
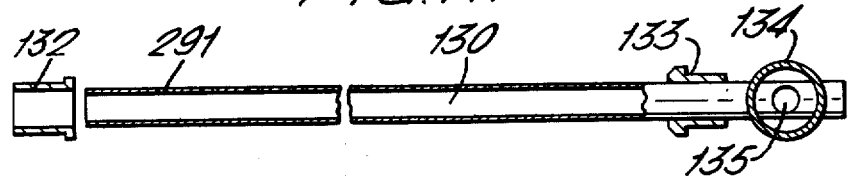

In the accompanying drawings,

FIG. 1 is an isometric view of a cabinet including the improvements in glass washing apparatus provided by the present invention;

FIG. 2 is a central longitudinal cross-section, partly schematic, of the invention shown in FIG. 1;

FIG. 3 is a top plan view, along the lines III—III of FIG. 2, shown partly broken away in cross-section;

FIG. 4 is a cross-section along the line IV—IV of FIG. 3;

FIG. 5 is a cross-sectional enlarged view of detail V of FIG. 4;

FIG. 6 is a cross-sectional enlarged view of detail VI of FIG. 4;

FIG. 7 is a side elevational view of the drive shaft of the machines shown in FIG. 1, including the placement of the gear mesh adjustment racks;

FIG. 8 is an isometric view of a typical gear mesh adjustment rack;

FIG. 9 is a central longitudinal cross-sectional view of a roller used in the loading and take-off sections of the conveyor;

FIG. 10 is a central longitudinal cross-sectional view of a roller used in the glass washing section of the conveyor; and FIG. 11 is a central longitudinal cross-sectional view of one of the spray tubes.

2. SPECIFIC DESCRIPTION OF FIG. 1

Turning now to FIG. 1, the invention is depicted in the form of a cabinet 10 including a table section 11, over which is centrally mounted a hood section 12. Hood section 12 includes a counter 13, and may be provided with water taps 14 and BeerMaster taps 15. The table section is provided with a conveyor 21 including a loading station 16, a washing station 17 (under hood 12) and a take-off station 18. While not shown, the loading station may be provided with spray guards to minimize possible splashing of wash liquid by deflection of the glasses being washed. The spray guards may conveniently be lightweight plastic streamers depending from the counter 13. A conventional sink 19 is provided at an extension of the conveyor 21. Doors 20 are provided to provide access to the interior of cabinet 10.

3. SPECIFIC DESCRIPTION OF FIGS. 2 and 3

As seen in FIGS. 2 and 3, the conveyor 21 includes a plurality of transversely located, spaced-apart rollers 22. The rollers 22 in the loading station 16 and in the take-off station 18 are formed of any suitable non-corrosive, rigid material, e.g. stainless steel and are covered by a synthetic plastics material tubing, e.g. polyethylene, to minimize and substantially prevent glass breakage. They will be described in greater detail in FIG. 9.

The rollers 23 in the hood or glass washing section 17 are formed of suitable non-corrosive rigid material, e.g. stainless steel. They will be described in greater detail in FIG. 10. Disposed between rollers 23 and interspersed along the length of the conveyor 21 are lower spray tubes 24, provided with upwardly projecting nozzles 291. They will be described in greater detail in FIG. 11.

All rollers are mounted in a manner to be described in greater detail hereinafter between parallel longitudinal rails 25, 26.

Within the hood or glass washing section 17 are a plurality of upper spray tubes 28. Upper spray tubes 28 are desirably formed of the same material as lower spray tubes 24, e.g. stainless steel, and are provided with downwardly projecting nozzles 29. The first few and last few upper spray tubes 28 and lower spray tubes 24 within the hood or glass washing section 17 are connected to a cold water supply pipe 30 to provide both upwardly directed cold water rinsing spray 31 from the nozzles 291 of lower spray tubes 24, and downwardly directed cold water rinsing spray 32 from the nozzles 91 of upper spray tubes 28. The remainder of the upper spray tubes 28 and the lower spray tubes 24 are connected to a chemical supply pipe 33 to provide both upwardly directed chemical washing and sterilizing spray 34 from the nozzles 291 of lower spray tubes 24, and downwardly directed chemical washing and sterilizing spray 35 from the nozzles 29 of upper spray tubes 28.

A catch tray 36 is provided on the floor 37 of main pan 59 which is secured within the table 11. Catch tray 36 is disposed to receive chemical sprays 34 and 35 after they have impinged on the glasses. Such chemical is led by downwardly sloping pipe 38 to a drain 39 which feed a chemical recovery tank 40. Tank 40 leads via return line 41 to the intake 42 of a pump 43 driven by motor 44, the pump 43 including an outlet 45 leading to the chemical supply pipe 33.

The rinse water from sprays 32 and 31 after impingement with the glasses are received on the floor 37 of the downwardly sloping main pan 59 and runs by gravity to drain 46 which is connected through trap 47 and line 48 to water disposal drain (not shown). Also disposed within cabinet 10 is a refrigerated chamber 531 operated by a blower 541 and a refrigerator unit 551 interconnected by a refrigerant line 561.

The motor 43 which drives pump 44 by means of drive pulley 49 and drive belt 50 also drives a reduction gear system 51, the output of which drives a drive sprocket 52 entrained by a drive chain 53 driving a headshaft sprocket 54 (see FIG. 7) which will be described later.

4. SPECIFIC DESCRIPTION OF FIGS. 2, 4, 6, 7 and 8

Turning now to FIGS. 2, 4, 6, 7 and 8, the operative construction of the conveyor drive system will now be described. The drive mechanism includes a longitudinally extending worm shaft 56 which, for silent operation is preferably made of a synthetic plastics material, e.g. nylon, which drives rollers 22 through engagement with gear 57, which, for silent operation is preferably made of a synthetic plastics material, e.g. Delrin.

The worm shaft 56 is securely mounted in a bench-shaped trough 58 which is mounted in the main pan 59 in a manner to be described later. Trough 58 includes an upper, vertical longitudinally extending section 70, including a downturned lip 71, a horizontal longitudinally extending section 72 and a lower, vertical longitudinally extending section 73, the upper section 70, 71 and horizontal section 72 being provided with end walls 62. At the upper, drive end, and at the lower driven end, the shaft 56 is mounted in bushings 60, suitably formed of brass, the bushings being secured to the end walls 62 of the trough 58 by suitable means, e.g. welding. A three-piece bearing 63 is secured to each bushing 60 and the end of the shaft 56 at the driven end by nut 64 screwed onto threaded end 65. At the drive end, a headshaft sprocket 54 is splined onto the shaft 56 by means of bolt 67. A sleeve 61 is secured onto the shaft 56 to complete the assembly.

The trough 58 is mounted within main pan 59 by means of jacks 80 in the following manner. Each jack 80 (see FIG. 8) includes a base plate 81, an upright bolt 82, an adjustment nut 83, a lock nut 84 and a top plate 85. The bottom of horizontal section 72 of trough 58 rests on top plate 85, while the base plate 81 is securely fixed, e.g. by welding, to the inside of the floor 37 of the main pan 59. Rotation of the adjustment nut 83 causes the trough 58 and its worm gear shaft 56 and its assembly to move up and down into engagement with gears 57 which are secured within a vertically fixed mounting of the rollers 22.

At the drive end of roller 22, shown in FIG. 4 and in enlargement in FIG. 6, the gear 57 is shown secured thereby by means well known in the art and not specifically shown. The end of the roller 22 projecting beyond gear 57 is rotatably mounted in bearing 90 secured to bushing 91, itself secured to an aperture in a rail 92. Rail 92 includes a vertical longitudinally extending mounting portion 93, a lower horizontally extending spacing portion 94 and an upper horizontally extending shelf portion 95. Shelf portion 95 supports L-shaped plate 98. Plate 98 itself supports cover plate 96 which includes a downturned lip 99 for the purpose of covering the gears 57. Plate 98 also includes a decorative splash guard 100.

At the other end of roller 22, a reduced diameter terminal shaft 101, as well as the terminal portion of the roller 22 are rotatably mounted within bushing 102, which, in turn, is fixed to an aperture 103 in side rail 140. Bushing 102 includes a shoulder 105 to limit the amount of lateral movement of roller 22. Side rail 26 includes a main vertical, longitudinally extending wall 97, and an upper, horizontal support shelf 104. Supported on shelf 104 is a sub-rail system 140 including a horizontal portion 107 terminating in a decorative splash guard 108 similar to splash guard 100. Depending from an internal edge of shelf 104 is a vertical support wall 141 terminating in a lower horizontal longitudinally extending spacing wall 106.

Resilient mounting of roller 22 within bushing 102 is provided by a pivotally mounted bench-shaped plate 109. Bench plate 109 includes a lower, vertical longitudinally extending portion 110 provided with an ear 111 co-operating with a similar ear on wall 141 and held thereto by pin 112 to provide a fulcrum point; a central, horizontal longitudinally extending portion 113; and an upper, vertical longitudinally extending portion 114, whose upper surface abuts the end of terminal shaft 101. A coil spring 115 is disposed between walls 97 and 110 to provide resilient urging against the end of the terminal shaft 101 of the roller 22.

5. SPECIFIC DESCRIPTION OF FIG. 9

In FIG. 9, the roller 22 is provided with a reduced diameter terminal shaft 101 which is, in effect, an enlarged diameter central portion provided by a tubular envelope 120, formed of a synthetic plastics materials, e.g. polyethylene, to minimize glass breakage. Terminal shaft 101 is to be freely rotatably mounted in reduced diameter portion 121 of bushing 102, with the roller 22 and the tubular envelope 120 fitting in the main portion of bushing 102. At the other end, the gear 57 is mounted on the roller 22 to provide a terminal extension 122 thereon which is adapted to be rotatably mounted in bushing 91.

The rollers shown in FIG. 9 are adapted to be used at the loading and take-off sections 16 and 18.

6. SPECIFIC DESCRIPTION OF FIG. 10

In FIG. 10, a simple structure of the roller 22 in the washing section 17 is shown. Roller 22, preferably of stainless steel, is adapted to be freely rotatably mounted at one end in a bushing 123, while at the other end, the gear 57 is secured to provide a terminal extension 124, which is also adapted to be freely rotatably mounted in bushing 91.

7. SPECIFIC DESCRIPTION OF FIG. 11

In FIG. 11, the structure of the lower spray tubes 24 is shown. It includes main tube 130, provided with a plurality of upwardly directed jet nozzles 291. One end is secured within a mounting 132, similar to bushing 123, except that relative rotation is not required. At the other end, the tube 130 passes through a mounting 133, similar to bushings 91, and to the interior of a header 134 and projects beyond, the passage therethrough being of a liquid-tight nature, well known to those skilled in the art. Each tube 130 is in liquid communication with the interior of header 134 by opening 135. Header 134 is connected to cold water pipe 30 or to chemical pipe 33, depending on whether a rinsing spray or a washing and sterilizing spray are required.

While not shown, the upper spray tubes 28 are also provided with similar headers.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. An improved washing machine comprising: a conveyor table having a loading station provided with infeed driven roller conveyor means and a take-off station provided with outfeed driven roller conveyor means; a washing station intermediate said loading station and said take-off station of said conveyor table, said washing station including transversely extending driven roller conveyors, a plurality of transversely extending lower hollow tubes, disposed between selected ones of said driven roller conveyors and dispersed along the length of the conveyor, each lower tube being provided with a plurality of upwardly directed spray nozzles, for directing spray vertically upwardly substantially perpendicular to said lower hollow tubes, the upper level of each such hollow tube being coincident with the upper level of the conveyor rollers, and an upper hood, said upper hood including a plurality of upper, hollow transversely extending tubes disposed vertically above said lower hollow tubes, each said upper hollow tube being provided with downwardly directed nozzles, for directing a spray of wash water vertically downwardly substantially perpendicularly to said upper hollow tubes.

2. The washing machine of claim 1, wherein the rollers, the lower tubes and the upper tubes are formed of stainless steel.

3. The washing machine of claim 2 wherein the rollers in the loading station and in the take-off station are covered in a tubular envelope formed of a synthetic plastics material.

4. The washing machine of claim 3 wherein said synthetic plastics material is polyethylene.

5. The washing machine of claim 1 wherein said lower hollow tubes and said upper hollow tubes are each provided with liquid infeed headers linked to one another and to liquid infeed pipes.

6. The washing machine of claim 1 wherein said conveyor table comprises a pair of parallel longitudinal rail members; a driven worm gear disposed and rotatably mounted adjacent and parallel to one such rail member; and a plurality of driven rollers disposed between the rails, each driven roller including a pinion, operatively engaging and driven by the worm gear.

7. An improved glass washing machine, comprising: a conveyor table having a loading station provided with infeed transversely extending driven roller conveyor means; a take-off station provided with outfeed transversely extending driven roller conveyor means; said conveyor table including a pair of parallel longitudinal rail members; a driven worm gear, disposed and rotatably mounted adjacent and parallel to one such rail member, said worm gear being mounted at a fixed vertical level within a trough mounted within said main pan, said trough being vertically adjustable in height; and a plurality of driven rollers disposed between the rails, said rollers being mounted at a fixed vertical level within a main pan; each driven roller including a pinion, operatively engaging and driven by the worm gear; and a washing station intermediate the loading station and the take-off station of the conveyor table and including driven roller conveyor means; said intermediate washing station being provided with a plurality of lower hollow tubes, disposed between selected roller conveyors and dispersed along the length of the conveyor, each lower tube being provided with a plurality of upwardly directed spray nozzles, for directing wash water spray vertically upwardly, substantially perpendicular to said lower hollow tubes, the upper level of each such hollow tube being coincident with the upper level of the conveyor rollers, and an upper hood, said upper hood including a plurality of upper hollow tubes disposed vertically above said lower hollow tubes, each said upper hollow tube being provided with downwardly directed nozzles, for directing a spray of washing liquid vertically downwardly substantially perpendicularly to said upper hollow tubes.

8. The glass washing machine of claim 7, wherein said height adjustment is provided by vertically adjustable jack means mounted between said main pan and said trough, and supporting said trough.

9. The glass washing machine of claim 7, wherein each of said conveyor rollers is spring loadedly mounted between said rails; and wherein each of said driven rollers of said conveyor is mounted within an associated bushing and is held in place against resiliently active pressure.

10. The glass washing machine of claim 7, wherein said lower hollow tubes and said upper hollow tubes are provided with liquid infeed headers linked to one another and to liquid infeed pipes.

11. The glass washing machine of claim 7 wherein said bottom of said main pan slopes downwardly from said loading station to said take-off station; wherein said main pan is provided with a gravity feed drain therein.

12. The glass washing machine of claim 7, including a catch pan disposed on said main pan to recover a selected portion of the spray of washing liquid from said upper nozzles and from said lower nozzles.

* * * * *